United States Patent
Takeuchi et al.

(10) Patent No.: US 7,092,403 B2
(45) Date of Patent: Aug. 15, 2006

(54) METHOD AND COMMUNICATION SYSTEM FOR DATA COMMUNICATION VIA A CABLE

(75) Inventors: Junichi Takeuchi, Tokyo (JP); Koichiro Suzuki, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 730 days.

(21) Appl. No.: 09/854,123

(22) Filed: May 11, 2001

(65) Prior Publication Data

US 2001/0040709 A1  Nov. 15, 2001

(30) Foreign Application Priority Data

May 12, 2000 (JP) ............... 2000-140132

(51) Int. Cl.
*H04J 3/22* (2006.01)
(52) U.S. Cl. ............ 370/465; 370/468; 710/302
(58) Field of Classification Search ............ None
See application file for complete search history.

(56) References Cited

U.S. PATENT DOCUMENTS 5,953,346 A * 9/1999 Luddy ............ 370/465
6,266,344 B1 * 7/2001 Fujimori et al. ............ 370/468
2003/0179719 A1 * 9/2003 Kobayashi et al. ............ 370/282

FOREIGN PATENT DOCUMENTS

JP 10-215295 8/1998
JP 3069868 4/2000

OTHER PUBLICATIONS

IEEE-SA Standards Board; Mar. 30, 2000; IEEE Standard 1394a.*
Hara, Yoshiko; May 28, 1999; "NEC looks to lead long-haul 1394 standards efforts"; EE Times.*

* cited by examiner

Primary Examiner—Seema S. Rao
Assistant Examiner—Robert C. Scheibel, Jr.
(74) Attorney, Agent, or Firm—Scully, Scott, Murphy & Presser, P.C.

(57) ABSTRACT

First, two subsystems are connected with each other via a communication cable and then recognize physical connection between the two subsystems. Next, each one of the two subsystems ignores signals from the other subsystem for a predetermined time period after recognition of the physical connection. Then, the two subsystems execute the connection procedure and after that, establish data communication between the two subsystems.

21 Claims, 4 Drawing Sheets

METHOD AND COMMUNICATION SYSTEM FOR DATA COMMUNICATION VIA A CABLE

BACKGROUND OF THE INVENTION

This invention relates to a communication system in which communication is established via communication cables and in which a predetermined connection procedure is executed when a communication cable is connected with a communication device. In particular, this invention relates to a communication system in which a communication cable is connected/disconnected with a communication device while the communication device is active.

In a communication system in which communication is established via a cable, a predetermined connection procedure generally has to be executed when the cable is connected with a device. In particular, if two devices whose transmission rates are different from each other are to establish communication between them, the connection procedure has to include a step for arbitrating transmission rates (transmission rate arbitration).

It is assumed that first and second upper devices (e.g. LSIs) are connected with each other via a communication cable in above-mentioned communication system. Each of the first and second upper devices needs a set of Large Scale Integrator (LSI) for physical layer and a transceiver as serial interface. Namely, the first upper device is connected with first physical layer LSI via first transceiver and the second upper device is connected with second physical layer LSI via second transceiver. The first and second transceivers are connected with each other via the communication cable. The first and second physical layer LSIs operate as serial interfaces.

If transmission rate of first physical layer LSI (first transmission rate) and that of second physical layer LSI (second transmission rate) are different from each other, transmission rate arbitration is required for the first and second physical layer LSIs. For example, if the maximum of the first transmission rate is 400 Mbps and the maximum of the second transmission rate is 200 Mbps, the transmission rate arbitration is executed between the first and second physical layer LSIs to harmonize transmission rate between them at 200 Mbps when they are connected with each other via the communication cable.

In this communication system, the connection procedure including the transmission rate arbitration is immediately required every time the communication cable is connected. However, connection/disconnection between a communication cable and device often causes noise that makes it hard to guarantee end of the connection procedure including the transmission rate arbitration. Especially, when the system is an optical communication system, noise caused on cable connection/disconnection adversely affects light, and consequently, it becomes harder to guarantee the end of the connection procedure.

SUMMARY OF THE INVENTION

It is an object of this invention to provide a method, a communication system and a device for correctly finishing connection procedure even if connection/disconnection between a communication cable and a connector causes noise to occur.

According to this invention, a method of establishing data communication between two subsystems via a communication cable in a communication system is provided. In the method, the data communication is established after a predetermined connection procedure between the subsystems via the communication cable. The method comprises the steps of: connecting two subsystems with each other via the communication cable; the two subsystems recognizing physical connection between the two subsystems; each one of the two subsystems ignoring signals from the other subsystem for a predetermined time period from the step of recognizing; the two subsystems executing the connection procedure; and establishing data communication between the two subsystems.

In the method, each one of the two subsystems may send constant signals to the other subsystem at the step of ignoring.

In the method, the connection procedure may comprise arbitration of transmission rate. In this case, the arbitration may comprise the steps of: each one of the two subsystems informing the other subsystem of its transmission rate; and lowering higher transmission rate to lower transmission rate so as to be correspondent transmission rates of the two subsystems with each other. Furthermore, the arbitration may further comprise the step of each one of the two subsystems sending an acknowledgement signal to the other subsystem when the subsystem recognizes the correspondence of the transmission rate.

In the method, the communication system may be a optical communication system. In this case, the communication cable may comprise plastic optical fiber.

According to this invention, a communication system for establishing data communication, comprising at least one communication cable and at least two subsystems is provided. The communication cable connects two of the subsystems with each other. The data communication is established between the subsystems after a predetermined connection procedure. Each of the subsystems comprises: a physical layer interface circuits for recognizing physical connection with another subsystem and executing the connection procedure; and a protection circuit for ignoring signals sent from another subsystem for a predetermined time period after the physical layer interface circuit recognizes physical connection with another subsystem.

In the communication system, the subsystem may send constant signals to another subsystem for the predetermined time period after the physical layer interface circuit recognizes physical connection with the other subsystem.

In the communication system, the connection procedure may comprise arbitration of transmission rate. In this case, the arbitration may comprise the steps of: each one of the two subsystems informing the other subsystem of its transmission rate; and lowering higher transmission rate to lower transmission rate so as to be correspondent transmission rates of the two subsystems with each other. Furthermore, the subsystem may send an acknowledgement signal to the other subsystem when the subsystem recognizes the correspondence of the transmission rate after the arbitration.

The communication system may be an optical communication system. In this case, the communication cable may comprise plastic optical fiber.

According to this invention, a device, which establishes data communication with another device via a communication cable, is provided. The data communication is established after a predetermined connection procedure. The device comprises: a physical layer interface circuits for recognizing physical connection with another device and executing the connection procedure; and a protection circuit for ignoring signals sent from another device for a predetermined time period after the physical layer interface circuit recognizes physical connection with another device.

The device may send constant signals to another device for the predetermined time period after the physical layer interface circuit recognizes physical connection with the other device.

The physical layer interface circuit may arbitrate transmission rate between the device and another device that is physically connected to the device. In this case, the physical layer interface circuit: informs the other device of its transmission rate; is informed the other device's transmission rate by the other device; and lowers its transmission rate if its transmission rate is higher than that of the other device.

The device is for a node of an optical communication system. In this case, the communication cable may comprise a plastic optical fiber.

DESCRIPTION OF THE PREFERRED EMBODIMENTS

Figure 1:
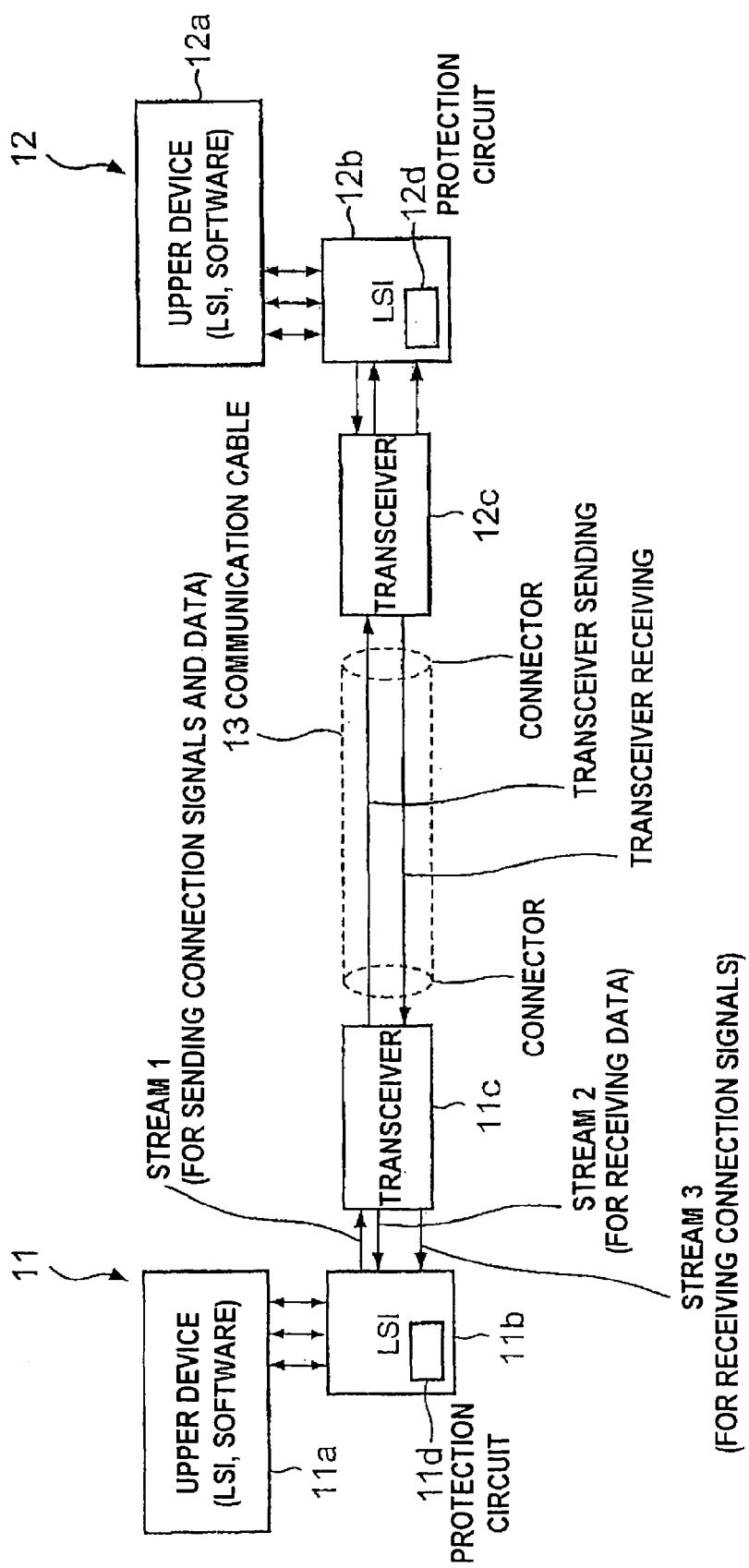
FIG. 1 shows a block diagram of a communication system according to an embodiment of the present invention.

Referring to FIG. 1, description will be made about a communication system according to an embodiment of the present invention, The communication system includes subsystems 11 and 12. The subsystems 11 and 12 communicate with each other via a communication cable 13 (e.g. optical fiber). The subsystem 11 includes an upper device 11a (e.g. LSI), an LSI 11b (physical layer LSI) operable as interface of physical layer, and a transceiver 11c. Similarly, the subsystem 12 includes an upper device 12a (e.g. LSI), a physical layer LSI 12b, and a transceiver 12c. When the subsystems 11 and 12 communicate with each other, the transceivers 11c and 12c are connected with each other via the communication cable 13.

Transmission rate of the physical layer LSI 11b is different from that of the physical layer LSI 12b. Hereinafter, it is assumed that the maximum transmission rate of the physical layer LSI 11b is equal to 400 Mbps and the maximum transmission rate of the physical layer LSI 12b is equal to 200 Mbps.

Figure 2:
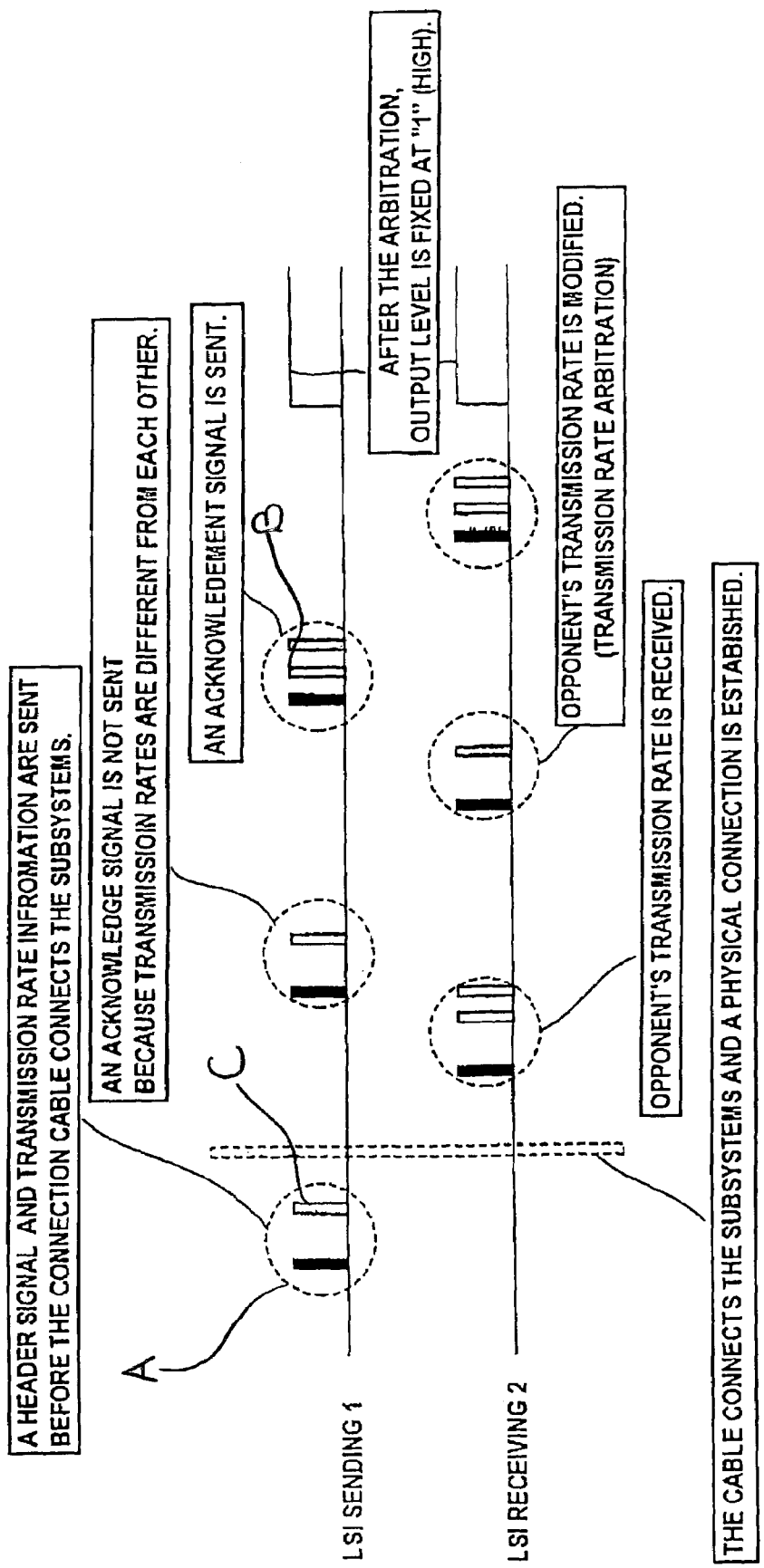
FIG. 2 shows a chart for describing a connection procedure which includes an arbitration of transmission rate between two subsystems and which is executed in the communication system illustrated in FIG. 1.

A connection procedure of the communication system is described below. As shown in FIG. 2, when the subsystem 11 is turned on, the subsystem 11 produces header signal (A) and sender's LSI transmission rate information (C) even if the communication cable 13 is not connected with the transceivers 11c and 12c. Namely, when the subsystems 11 and 12 are turned on, each of the subsystems 11 and 12 produces the header signal (A) and the sender's LSI transmission rate information (C).

As mentioned above, when the subsystems 11 and 12 are turned on and connected with each other via the communication cable 13 at the connectors, in the subsystem 11, the physical layer LSI 11b sends first header signal (A) and first sender's LSI transmission rate information (C) through a stream 1 for sending connection signals and data to the subsystem 12.

Similarly, in the subsystem 12, the physical layer LSI 12b sends second header signal (A) and second sender's LSI transmission rate information (C) through an stream 3 for sending connection signals to the subsystem 11.

Therefore, the subsystems 11 and 12 acquire the opponents transmission rate by the physical layer LSIs 11b and 12b. It has been assumed that the first transmission rate is faster than the second transmission rate. In this case, the physical layer LSI 11b lowers its transmission rate in order to harmonize its transmission rate with the transmission rate of the physical layer LSI 12b.

When the transmission rates are harmonized, the physical layer LSI 11b inserts an acknowledgement signal (B) between the header signal (A) and the sender's transmission rate information (C) and sends them. It is noted that, when the acknowledgement signal (B) is sent, the transmission rate expressed by the first sender's transmission rate information (C) is coincident with the transmission rate expressed by the second sender's transmission rate information (C). On the other hand, when the physical layer LSI 12b receives the acknowledgement signal (B) from the subsystem 11, the physical layer LSI 12b similarly inserts an acknowledge signal (B) between the second header signal (A) and second sender's LSI transmission rate information (C) to send them to the subsystem 11.

Figure 3:
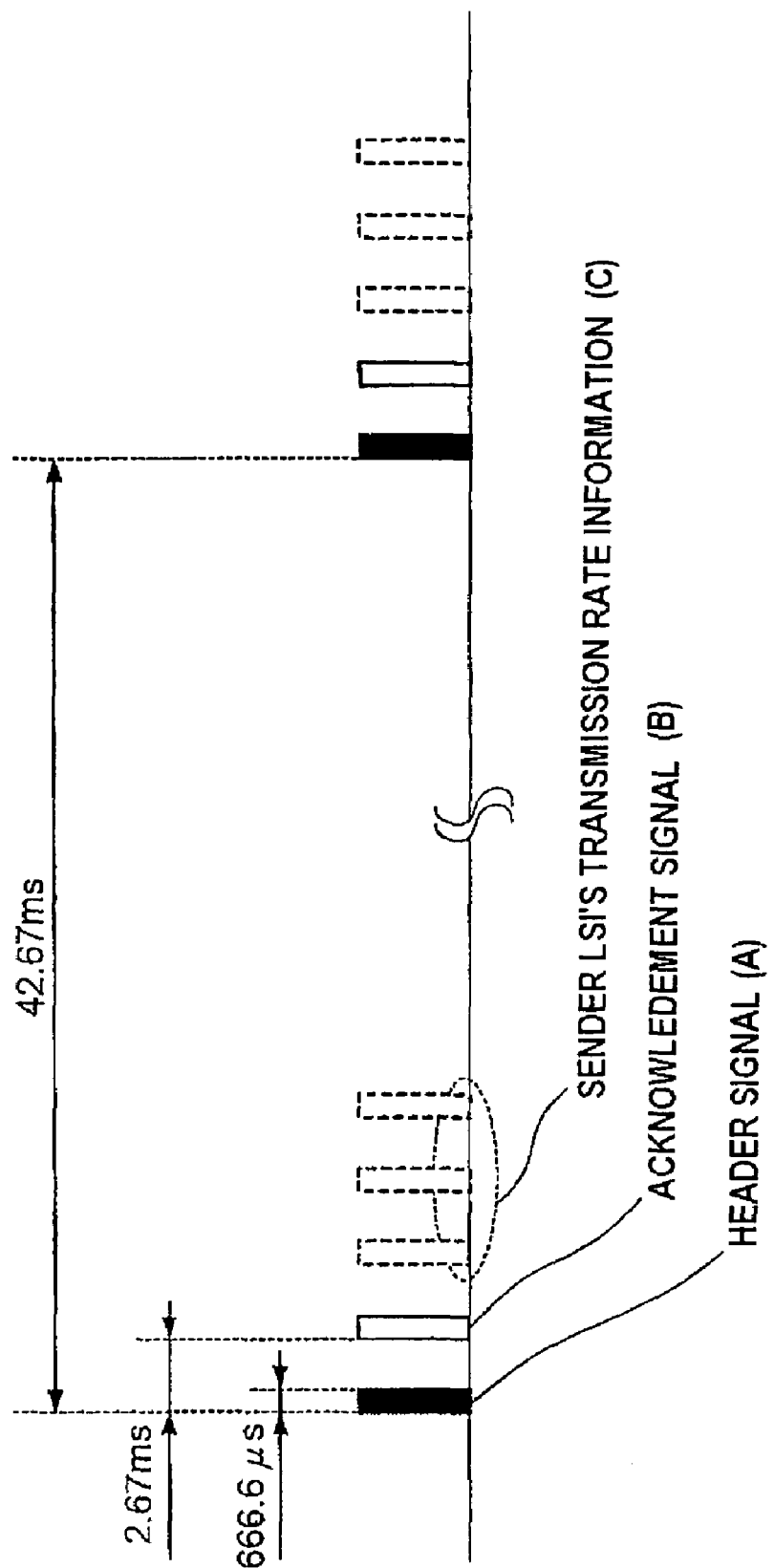
FIG. 3 shows a chart for describing a signal format of a signal sent in the connection procedure.

For example, the frame sent from the subsystem 11 or 12 has a structure as shown in FIG. 3. The structure includes the header signal (A), the acknowledgement signal (B) and the sender's LSI transmission rate information (C). In FIG. 3, the interval between continual two frames is 42.67 ms; each pulses of signal is 666.6 µs in width; and the interval between continual two signals is 2.67 ms.

After the transmission rates are harmonized with each other, the physical layer LSIs 11b and 12b produce a high level signal "1". Next, each of the physical layer LSIs 11b and 12b confirms that the opponent system keeps sending the high level signal, and then starts sending data to the opponent subsystem.

Generally, connection/disconnection between a communication cable and a device may cause noise to occur. Therefore, if the connection procedure is executed immediately after connecting the communication cable 13 with the connector, then the connection procedure may fail because of the noise.

In order to prevent the connection procedure from being adversely affected, the physical layer LSI 11b and 12b include protection circuits 11d and 12d, respectively. For example, the protection circuits 11d and 12d interrupt the connection procedure for a predetermined time period T after the subsystems 11 and 12 are connected with each other via the communication cable 13.

Figure 4:
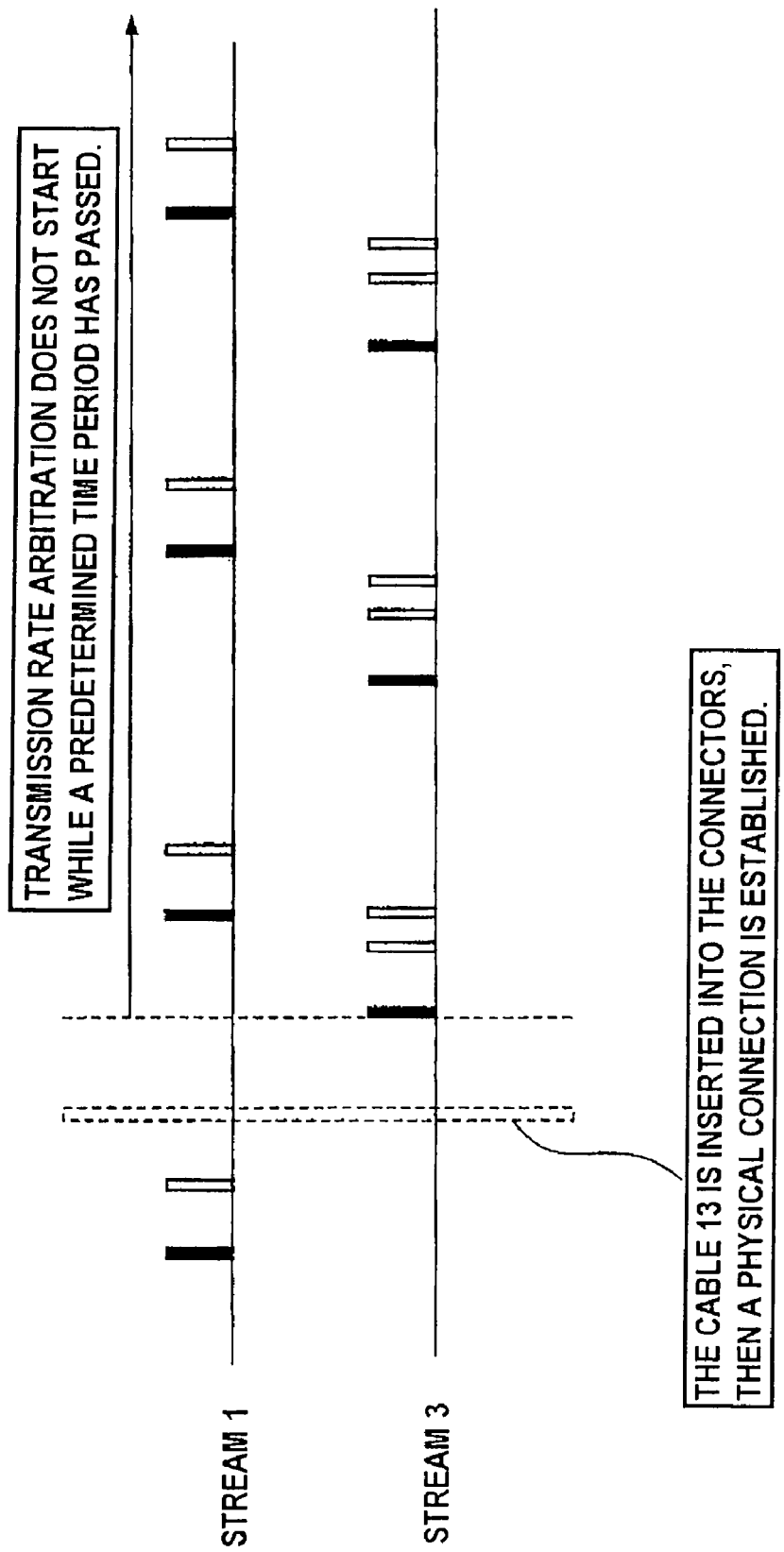
FIG. 4 shows a chart for describing a delay of transmission rate arbitration.

As shown in FIG. 4, when the time period T has passed after the subsystems 11 and 12 are connected with each other via the communication cable 13, the connection procedure starts as shown in FIG. 2.

Specifically, when the physical layer LSI 11b/12b receives the header signal (A), the following procedures are executed:

(1) the physical layer LSI 11b/12b recognizes that the connection with the communication cable 13 is established, (2) the protection circuit 11d/12d prevents the physical layer LSI 11b/12b from executing the connection procedure for the time period T, and after passing the time period T,3 (3)

the protection circuit 11d/12d permits the physical layer LSI 11b/12b to start the connection procedure.

Consequently, the subsystems 11 and 12 only produce the header signal (A) and sender's LSI transmission rate information (C) in the time period T. In other words, in the time period T, the subsystems 11 and 12 produce no acknowledgement signal (B) and, as a result, the connection procedure is not finished. The time period T depends on construction of the communication system. For example, if the system is a optical communication system, in particular which includes a communication cable made of POF (plastic optical fiber) and transceivers for POF, the noise caused by connecting the cable with the transceiver is larger so that the time period T is set longer.

Description will be made about the protection circuits 11d and 12d. When the protection circuit 11d/12d has received the header signal (A), the protection circuit 11d/12d starts to count up at its inner timer which is set the time period T. The time period T is set so as to be beyond a time period in which the noise occurs, with reference to quality of the communication cable 13 and the connector.

When a subsystem receives signals from another subsystem, receiver's protection circuit actually masks receiving signals in order to block the receiving signals to receiver's upper device, until the inner timer has counted to the time period T.

On the other hand, the sender subsystem repeatedly generates the head signal (A) and the sender's LSI transmission rate information (C). No acknowledgement signal (B) is sent. As a result, when the inner timer has counted to the time period T, the connection procedure shown in FIG. 2 starts.

As mentioned above, it is possible to mix noise in signals for a while from a time instant when the connection cable is connected with the connector. If the sender's LSI transmission rate information (C) is incorrectly recognized, the connection procedure incorrectly finishes. For example, if the receiver physical layer LSI receives the sender's LSI transmission rate information (C) with the noise and incorrectly recognizes that the transmission rate of the sender subsystem corresponds with the transmission rate of the receiver subsystem, then the receiver's physical layer LSI sends the acknowledgement signal (B) back to the sender subsystem. As a result, the receiver subsystem has finished the connection procedure, on the other hand, the sender subsystem has not finished the connection procedure yet. Namely, the communication system can not finish the connection procedure.

In the communication system of the present invention, however, the connection procedure is executed after lapse of the predetermined time period T after the communication cable is connected with the connector. Therefore, the connection procedure can avoid influence of the noise, and consequently, can finish steady and correctly.

After finishing the connection procedure, in the subsystem 11, the upper device 11a sends data to the physical layer LSI 11b. The physical layer LSI 11b sends the data via the stream 1 (data communication) to the subsystem 12. Similarly, in the subsystem 12, the upper device 12a sends data to the physical layer LSI 12b. The physical layer LSI 12b sends the data to the subsystem 11. Again, in the subsystem 11, the physical layer LSI 11b receives the data sent form the subsystem 12 via the stream 2 (data communication) and relay the data to the upper device 11a.

As mentioned above, according to the present invention, when the communication cable is connected, first, to start the connection procedure is interrupted for the time period T, and then, the connection procedure is started. Namely, for the time period T, the physical layer LSI ignores receiving signals and sends constant signals. Consequently, this invention can remove influence of noise that occurs when the communication cable is connected with the connector.

While this invention has thus far been described in conjunction with a embodiment thereof, it will be readily possible for those skilled in the art to put the this invention into various other manners. For example, in above-mentioned embodiment, the connection procedure includes arbitration of transmission rate between two subsystems. However, the connection procedure can further include various kinds of information exchange. In this case, all of included information exchange can prevent from being affected by the noise. For another example, the time period T may be counted from a time instant when the signal come down, though above-mentioned embodiment counts the time period T from the time instant when the signal come up as shown in FIG. 4.

What is claimed is:

1. A method of establishing data communication between two subsystems via a communication cable in a communication system, the data communication being established after a predetermined connection procedure between the subsystems via the communication cable, comprising the steps of:
   connecting two subsystems with each other via the communication cable;
   recognizing physical connection between the two subsystems by the two subsystems;
   ignoring signals by masking the signals from one of the two subsystems to the other for a predetermined time period from the recognizing step;
   executing the connection procedure by the two subsystems after said predetermined time period has elapsed; and
   establishing data communication between the two subsystems.

2. The method claimed in claim 1, wherein each one of the two subsystems sends constant signals to the other subsystem after the ignoring step.

3. The method claimed in claim 1, wherein the connection procedure comprises arbitration of transmission rate.

4. The method claimed in claim 3, wherein the arbitration comprises the steps of:
   informing one of the subsystems of the other subsystem's transmission rate; and
   lowering higher transmission rate to lower transmission rate so as to be correspondent transmission rates of the two subsystems with each other.

5. The method claimed in claim 4, wherein the arbitration further comprises the step of sending an acknowledgement signal from one of the subsystems to the other when the subsystem recognizes the correspondence of the transmission rate.

6. The method claimed in claim 1, wherein the communication system is an optical communication system.

7. The method claimed in claim 6, wherein the communication cable comprises plastic optical fiber.

8. A communication system for establishing data communication, comprising at least one communication cable and at least two subsystems, the communication cable connecting two of the subsystems with each other, the data communication being established between the subsystems after a predetermined connection procedure, wherein each of the subsystems comprises:

a physical layer interface circuits for recognizing physical connection with another subsystem and executing the connection procedure; and a protection circuit for ignoring signals by masking signals sent from another subsystem for a predetermined time period after the physical layer interface circuit recognizes physical connection with another subsystem thereby causing the physical layer interface circuits to execute the connection procedure after said predetermined time period.

9. The communication system claimed in claim 8, wherein the physical layer interface circuit recognizes physical connection with the other subsystem, and the subsystem sends constant signals to another subsystem after the predetermined time period has passed.

10. The communication system claimed in claim 8, wherein the connection procedure comprises arbitration of transmission rate.

11. The communication system claimed in claim 10, wherein the arbitration comprises the steps of:
  each one of the two subsystems informing the other subsystem of its transmission rate; and
  lowering higher transmission rate to lower transmission rate so as to be correspondent transmission rates of the two subsystems with each other.

12. The communication system claimed in claim 11, wherein the subsystem sends an acknowledgement signal to the other subsystem when the subsystem recognizes the correspondence of the transmission rate after the arbitration.

13. The communication system claimed in claim 8, wherein the communication system is an optical communication system.

14. The communication system claimed in claim 13, wherein the communication cable comprises plastic optical fiber.

15. A device which establishes data communication with another device via a communication cable, the data communication being established after a predetermined connection procedure, comprising:

a physical layer interface circuits for recognizing physical connection with another device and executing the connection procedure; and a protection circuit for ignoring signals by masking signals sent from another device for a predetermined time period after the physical layer interface circuit recognizes physical connection with another device thereby causing the physical layer interface circuits to execute the connection procedure after said predetermined time period.

16. The device claimed in claim 15, wherein the physical layer interface circuit recognizes physical connection with the other device, and the device sends constant signals to another device after the predetermined time period has passed.

17. The device claimed in claim 15, wherein the physical layer interface circuit arbitrates transmission rate between the device and another device that is physically connected to the device.

18. The device claimed in claim 17, wherein the physical layer interface circuit:
  informs the other device of its transmission rate;
  is informed the other device's transmission rate by the other device; and
  lowers its transmission rate if its transmission rate is higher than that of the other device.

19. The device claimed in claim 18, wherein the device sends an acknowledgement signal to the other device when the device recognize the correspondence of the transmission rate after the arbitration.

20. The device claimed in claim 15, wherein the device is for a node of an optical communication system.

21. The device claimed in claim 20, wherein the communication cable comprises a plastic optical fiber.

* * * * *